Patented Apr. 12, 1938

2,113,977

UNITED STATES PATENT OFFICE 2,113,977

MANUFACTURE OF MIRRORS

Albert Moore Barnes, Acton, London, England, assignor to Duro-Ray Limited, London, England, a British company No Drawing. Application January 23, 1935, Serial No. 3,143. In Great Britain February 8, 1934

10 Claims. (Cl. 91—69.1)

This invention concerns improvements in the manufacture of mirrors of glass or similar transparent or translucent materials, particularly mirrors for domestic and/or decorative purposes.

It is common practice in glass silvering to make use of the well known silver ammonium tartrate process in any one of its numerous modifications in order to produce the silver film itself, and further to "back" or protect the silver film thereby formed by means of paints and varnishes which may, if desired, contain such metals as aluminium in finely divided particle form, or by electro-depositing an extremely thin coating of copper on to the silver film, the thus applied copper coating being further protected by the application of paints or varnishes, or again after applying a coating of varnish to the copper surface to stretch a thin sheet of lead over the varnished copper and to press or roll it into good mechanical contact, the lead providing the metal protective backing, or alternatively to electro-deposit lead on to the copper for its better protection against injury.

None of these prior proposals when carried into practice are entirely satisfactory for mirrors, particularly mirrors for domestic and/or decorative purposes, the principal reason being the lack of exact knowledge as to the formation and characteristics of the silver film itself and its deposition on the glass surfaces. Silver films produced by the silver ammonium tartrate process, in any of its numerous modifications, are not only extremely tenuous but, owing to their imperfect "structure", partially crystalline and pin-holey, are more or less light absorbent and in part, or whole, do not adhere to the glass surfaces as intimately as they should. Thus, the silver films or deposits, instead of being pure silver in the colloidal state and as such devoid of structure and in molecular contact with, and positively adherent to the glass surfaces, are more or less mixtures of silver partly colloidal, but mainly crystalline and further contaminated with silver in other states such as silver oxide. All or any of the structural defects referred to above are likely to become more pronounced during and after the application of the various protective paint or other backings. For example, granted the structural defects referred to above, it is impracticable to close or cover up these defects by the chemical or electro-deposition of copper because the copper surface must possess the same structure as that of the silver film on to which it has been deposited and when a paint or varnish is subsequently applied as a protective backing, decomposition products of these, under conditions of moisture and changing temperature, must sooner or later gain access to the perforate silver film and depreciate or destroy its light reflecting value by oxidation and corrosion. Furthermore, from the imperfect and partially crystalline perforate structure of the film there is every likelihood of the film, with its backing, stripping from the glass surface owing to the lack of that intimate adhesion which is the property of silver solely in the colloidal state. The loss of light reflecting value caused by imperfections and extreme tenuity of silver films applied by the silver ammonium tartrate processes is considerable and is commonly as much as 20% even in good quality silvering.

It is a desideratum to provide mirrors particularly mirrors for domestic and/or decorative purposes wherein the silver films are sufficiently dense, homogeneous and molecularly adherent to the glass or similar transparent or translucent surfaces, wherein the light reflecting properties of the silver films are at their maximum and wherein the silver films are adequately protected against atmospheric and other corrosion, mechanical abrasion, extreme variations in atmospheric temperature and, when used as a reflector of suitable curvature, against heat from light sources such as electric light or gas.

This desideratum is fulfilled in accordance with the present invention in which the process for silvering glass or similar transparent or translucent materials, particularly glass for domestic and/or decorative purposes, is characterized in that films of colloidal silver only are formed to predetermined linear thicknesses on their surfaces to facilitate the electro-deposition of metals for protective purposes. The application of this process to the manufacture of mirrors particularly for domestic and/or decorative purposes consists in electro-depositing a coating of lead upon the silver film.

The conditions which should preferably be observed in depositing the silver film and in electro-depositing the metal backing upon the silver film will now be referred to.

The silvering solutions which, for convenience, may be designated S.1. and S.2. for the silver solutions, and R. for the reducing solution, may be considered to resemble those used in the well known Brashier process for optical silvering. For instance the S.1. solution may be compounded by adding sufficient ammonium hydrate (NH$_4$OH) to silver nitrate (AgNO$_3$) dissolved in distilled water to convert the silver nitrate to silver oxide and to re-dissolve the precipitated silver oxide in an excess of ammonium hydrate. The S.2.

solution may consist of sodium hydrate (NaOH) dissolved in distilled water. Solution S.2. is then added to solution S.1. and to the mixed S.2. and S.1. sufficient ammonium hydrate is added to redissolve any excess of silver oxide that may appear as a precipitate after adding S.2. to S.1., care being taken to avoid an excess of ammonium hydrate. The mixed S.1. and S.2. solutions are then diluted with distilled water to a point when the original silver nitrate content is approximately 5.00 grams per litre, and the original sodium hydrate content is approximately 4.68 grams per litre. The R. solution may consist of cane sugar and tartaric acid dissolved in sufficient distilled water and in such proportion that it contains cane sugar 4.00 grams per litre and tartaric acid 0.24 gram per litre. The solutions S.1. and S.2. and the solution R. are purposely so compounded that equal volumes of solutions S.1. and S.2. and R. react when issuing from their respective nozzles referred to hereinafter and mix or mingle to form a jet of mixed solution double the volume of the separate solutions, (S.1.+S.2. and R.) and are purposely contrived to procure the exact condition of silver deposit, only in the colloidal state, on the surface of the material under treatment for example glass for domestic and/or decorative purposes.

The vessels, one containing the mixed S.1.+S.2. solution and the other the R. solution are conveniently mounted at a suitable height above the work to allow the solutions to be fed to the work by gravity. Alternatively compressed air may be used for this purpose, the containing vessels being kept at any convenient level. The solutions for silverings S.1.+S.2. and R. are caused to issue under the control of suitable valves or taps connected with the containers by suitable tubes or ducts. Each individual jet or combination of jets consists of two separate nozzles disposed towards each other at an angle of say 45°. Each jet consists of two nozzles, separately connected, one to the solutions S.1.+S.2., the other to the solution R. The solutions issuing from their respective nozzles, disposed towards each other at 45° are caused to mix at a calculated distance clear of the nozzles and by the adjusted volume of the flow of the solutions, they become a single jet of mixed solutions double the volume of the flow of the issue from the separate nozzles. At the point of the mingling of the two solutions, and by their calculated reaction when mixed, the jet or jets of mingled solution become actively silver depositing and when caused to flow over the glass or similar surfaces under treatment deposit pure silver in the colloidal state required, firstly as a slight discoloration or film of silver in the colloidal state. This film is rapidly built up by the constantly renewed flow of the mixed solutions which are only allowed to remain on the surface of the glass or similar transparent or translucent substance for example glass for domestic and/or decorative purposes whilst active in respect of the first calculated reaction and which drain off before depositing silver in other states than the colloidal state required for the purpose in view. The process of depositing silver in the colloidal state calling for no particular skill on the part of the operator, is under perfect control, and the building up to the required density is automatically governed by the time set for the operation, say from ten to fifteen minutes in accordance with the density required.

After a sufficiently dense and homogeneous film of silver in the colloidal state, adherent to and apparently in molecular contact with the glass or similar surface for example glass for domestic and/or decorative purposes, has been formed, the work is transferred to a bath for electro-depositing the lead backing.

This bath should be so constituted that the adhesion of the silver film to the glass is not adversely affected by the acid or alkaline reaction of the electrolyte employed. The electrolyte therefore is rendered as nearly neutral as may be consistent with correct working.

When electro-depositing lead a suitable electrolyte consists of an aqueous solution of lead perchlorate $Pb(ClO_4)_2$. in which the lead content is 37.5 grams per litre, and the free perchloric acid ($HClO_4$) content is 0.05%. Addition agents such as clove oil or peptone may be used to reduce the grain size of the deposited lead to the minimum.

By the calculated composition of the lead-containing electrolyte, the disposition of the lead anodes towards the cathode, (the silver film in contact with the glass or similar surfaces under treatment), and the electric current employed to complete the electro-deposition of the lead backing, a dense, non-crystalline and homogeneous coating of pure lead can be deposited on every portion of the outer surface of the silver film in such a manner that it is encased with pure and ductile lead, to such a predetermined thickness as to afford protection against mechanical injury, sea air, damp and moisture, and most of the more injurious fumes and gases likely to be encountered. Experience indicates that a lead deposit 0.002 inch in linear thickness is sufficient for this purpose but this thickness can be varied in either direction by a simple time adjustment.

The apparatus for carrying the process into effect comprises:

1. Means to hold and secure the glass sheet in position during the silvering process and at the same time to impart motion, which may be circular, gyratory or reciprocating in a horizontal plane. One way for securing this is to attach a vacuum plate or cup to the underside of the glass sheet and by means of a spindle carrying a ball which engages with a socket attached to the vacuum cup to support the glass on a circular table attached to a supporting pedestal in such a manner that it remains level or can be rotated whilst level in a horizontal plane, or can be lifted by its spindle attached to the vacuum cup to a sufficient height above the circular table attached to the supporting pedestal so that resting in an inclined position on the circular table the glass with the vacuum cup attached can be rotated at an angle inclined to the horizontal with a gyratory movement, or in any inclined plane desired, for the purpose of creating the proper flow of the silvering solution over the glass surface during the silvering process.

Alternatively the glass may be mounted on a suitable supporting table, and whilst so supported, by mechanical means such as gimbals or a system of levers and pendulums the table supporting the glass sheet may be inclined at any desired angle to secure the desired flow of solutions over and from the glass surface during the silvering operation. Trays or troughs can be arranged to collect the spent solutions draining from the glass during the silvering operation. The silvering, conducted at normal atmospheric temperature such as 65° F., does not call for the steam heated tables employed in silvering by the silver ammonium tartrate process.

2. Means for electro-depositing pure metallic lead as a protective backing directly on to the silver film previously deposited onto the glass surface as described comprise a suitable tank or vat to hold the electrolyte, lead anodes properly disposed in relation to the silvered glass sheet to be treated and a supporting frame to carry the silvered glass during the electro-deposition provided with contacts and electrical connections to couple up the silver film, acting now as the cathode in the lead depositing process, to the source of electric supply.

The mirrors produced in accordance with this invention consist primarily of a sheet of plane or curved glass or similar transparent or translucent material, a film of pure silver adherent to and in apparent molecular contact with the glass or similar transparent or translucent material and purposely contrived to be sufficiently dense and homogeneous so as to render it totally or 100% light reflecting for the value of pure silver as a light reflecting medium, and secondly of a coating of pure lead incorporated and in positive metallic contact with the underlying silver film. This protective coating of pure lead is homogeneous and imperforate by reason of its method of application upon an imperforate silver film produced as hereinbefore described and is calculated to protect permanently the silver film against such corrosive agencies as sea-air, damp and moisture and atmospheric and chemical fumes and gases. Since there is no place in the lead backing where moisture, fumes and gases can attack the silver film, its value, as the most efficient light reflecting surface obtainable, is permanently unimpaired by oxidation or corrosion from any external or internal source.

What I claim is:

1. A process for the manufacture of mirrors comprising the steps of forming a film of colloidal silver only to a predetermined linear thickness on a surface of transparent material and of electro-depositing on the silver film a coating of lead for protective purposes.

2. A process for the manufacture of mirrors comprising the steps of forming a film of colloidal silver only to a predetermined linear thickness on a surface of translucent material and of electro-depositing on the silver film a coating of lead for protective purposes.

3. A process for the manufacture of mirrors comprising the steps of forming a film of colloidal silver only to a predetermined linear thickness on a surface of glass and of electro-depositing on the silver film a coating of lead for protective purposes.

4. As a new article of manufacture a mirror consisting of transparent material, an adherent film of silver exclusively in the colloidal state upon the surface of said material and a protective backing of electro-deposited lead upon the silver film.

5. As a new article of manufacture a mirror consisting of translucent material, an adherent film of silver exclusively in the colloidal state upon the surface of said material and a protective backing of electro-deposited lead upon the silver film.

6. As a new article of manufacture a mirror consisting of glass, an adherent film of silver exclusively in the colloidal state upon the glass and a protective backing of electro-deposited lead upon the silver film.

7. A process for silvering glass and the like, comprising subjecting the glass to the action of newly combined component silvering solutions for such time as will cause the deposit thereon of only colloidal silver, draining the solution from the glass before silver in other than colloidal form is deposited, repeating such sequence of depositing and draining operations until the colloidal silver deposit on the glass is built up to a desired thickness, and electro-depositing a backing of lead on the colloidal silver deposit.

8. A process for silvering glass and the like, comprising continuously combining separate streams of component silvering solutions to form a stream of complete silvering solution, subjecting the glass to the newly formed complete solution for such time as will cause the deposit thereon of only colloidal silver, draining the solution from the glass before silver in other than colloidal form is deposited, repeating such sequence of depositing and draining operations until the colloidal silver deposit on the glass is built up to a desired thickness, and electro-depositing a backing of lead on the colloidal silver deposit.

9. A process for silvering glass and the like, comprising preparing a solution of silver nitrate in water, adding ammonium hydrate to said solution until a precipitate of silver oxide is formed, adding an excess of ammonium hydrate to the solution to dissolve the silver oxide, adding a solution of sodium hydrate to said solution, adding ammonium hydrate to the mixture to dissolve any silver oxide formed, mingling a stream of the mixture of solutions with a stream of reducing solution of cane sugar and tartaric acid in water, immediately flowing said mingled streams of solutions over the glass to be silvered, draining the mixture from the glass before silver in other than colloidal form is deposited, continuing to flow fresh portions of said solutions, immediately after mingling, over said glass until a silver deposit of desired density is obtained, and electro-depositing a layer of lead directly on the silver deposit.

10. A process for silvering glass and the like, comprising preparing a solution of silver nitrate in water, adding ammonium hydrate to said solution until a precipitate of silver oxide is formed, adding an excess of ammonium hydrate to the solution to dissolve the silver oxide, adding a solution of sodium hydrate to said solution, adding ammonium hydrate to the mixture to dissolve any silver oxide formed, said mixed solutions having an original silver nitrate content of approximately 5.00 grams per liter and an original sodium hydrate content of approximately 4.68 grams per liter, mingling a stream of the mixture of solutions with a stream of reducing solution of cane sugar and tartaric acid in water, said reducing solution having a cane sugar content of approximately 4.00 grams per liter and a tartaric acid content of approximately 0.24 gram per liter, immediately flowing said mingled streams of solutions over the glass to be silvered, draining the mixture from the glass before silver in other than colloidal form is deposited, continuing to flow fresh portions of said solutions, immediately after mingling, over said glass for ten to fifteen minutes, and electro-depositing a backing layer of lead on the silver deposit in an electrolyte consisting of an aqueous solution of lead perchlorate in which the lead content is approximately 37.5 grams per liter and the free perchloric acid content is approximately 0.05%.

ALBERT MOORE BARNES.